US011297870B2

(12) United States Patent
Barrett et al.

(10) Patent No.: US 11,297,870 B2
(45) Date of Patent: Apr. 12, 2022

(54) REDUCED SUCROSE SUGAR COATINGS FOR CEREALS AND METHODS OF PREPARATION

(75) Inventors: Christopher J. Barrett, Plymouth, MN (US); Patrick C. Dreese, Plymouth, MN (US); Daniel R. Green, Minnetonka, MN (US); Victor T. Huang, Maple Grove, MN (US); Christine Nowakowski, Plymouth, MN (US); Fern A. Panda, White Bear Lake, MN (US); Scott Whitman, New Hope, MN (US)

(73) Assignee: General Mills, Inc., Minneapolis, MN (US)

( * ) Notice: Subject to any disclaimer, the term of this patent is extended or adjusted under 35 U.S.C. 154(b) by 3160 days.

(21) Appl. No.: 13/173,298

(22) Filed: Jun. 30, 2011

(65) Prior Publication Data

US 2012/0003360 A1 Jan. 5, 2012

Related U.S. Application Data

(60) Provisional application No. 61/360,555, filed on Jul. 1, 2010.

(51) Int. Cl.
A23L 33/20 (2016.01)
A23L 33/125 (2016.01)
A23L 7/00 (2016.01)
A23L 5/00 (2016.01)
A23L 7/122 (2016.01)
A23L 29/30 (2016.01)
A23L 29/212 (2016.01)
A23P 20/10 (2016.01)
A23L 33/16 (2016.01)

(52) U.S. Cl.
CPC .............. *A23L 33/20* (2016.08); *A23L 5/00* (2016.08); *A23L 7/00* (2016.08); *A23L 7/122* (2016.08); *A23L 29/212* (2016.08); *A23L 29/30* (2016.08); *A23L 29/35* (2016.08); *A23L 33/125* (2016.08); *A23L 33/16* (2016.08); *A23P 20/10* (2016.08); *A23V 2002/00* (2013.01); *A23V 2200/3322* (2013.01)

(58) Field of Classification Search
None
See application file for complete search history.

(56) References Cited

U.S. PATENT DOCUMENTS

| | | | |
|---|---|---|---|
| 3,246,990 | A | 4/1966 | Thompson et al. |
| 3,464,827 | A | 9/1969 | Tsuchiya et al. |
| 3,600,193 | A | 8/1971 | Glabe et al. |
| 3,687,687 | A | 8/1972 | Liepa et al. |
| 4,378,377 | A | 3/1983 | Gajewski |
| 4,540,587 | A | 9/1985 | Gajewski |
| 4,859,477 | A | 8/1989 | Augustine et al. |
| 5,176,936 | A | 1/1993 | Creighton et al. |
| 6,139,886 | A | 10/2000 | Green et al. |
| 6,149,965 | A | 11/2000 | van Lengerich et al. |
| 6,174,553 | B1 | 1/2001 | Cerda et al. |
| 6,210,720 | B1 | 4/2001 | Leusner et al. |
| 6,287,621 | B1 | 9/2001 | Lacourse et al. |
| 7,431,954 | B2 | 10/2008 | Ballman et al. |
| 7,648,723 | B2 | 1/2010 | Zimeri et al. |
| 7,700,144 | B2 | 4/2010 | Pandey et al. |
| 2005/0079248 | A1* | 4/2005 | Stevens ............ A23B 4/08 426/94 |
| 2005/0255218 | A1 | 11/2005 | Green |
| 2005/0266142 | A1 | 12/2005 | Green |
| 2006/0286223 | A1 | 12/2006 | Long |
| 2008/0081349 | A1 | 4/2008 | Huebert et al. |
| 2008/0317919 | A1 | 12/2008 | Long |
| 2009/0081349 | A1* | 3/2009 | Kamper ............ A23G 3/52 426/561 |
| 2009/0208609 | A1* | 8/2009 | Lawson et al. ............ 426/93 |
| 2009/0214718 | A1 | 8/2009 | Leusner |

FOREIGN PATENT DOCUMENTS

| | | |
|---|---|---|
| CL | 02783-2008 | 9/2008 |
| EP | 1733629 | 12/2006 |
| WO | 2006/015880 | 2/2006 |
| WO | WO-2006138705 | 12/2006 |

* cited by examiner

Primary Examiner — Stephanie A Cox
(74) Attorney, Agent, or Firm — Diederiks & Whitelaw, PLC; John L. Crimmins, Esq.

(57) ABSTRACT

Disclosed are improved sugar coatings for topically pre-sweetened food products that are sugar reduced whether in the form of a syrup or in the form of a dried coating. The syrup form is useful as an intermediate product in the preparation of pre-sweetened food products. In dry form, the present formulations can be a component part of a composite food product especially in the form of a topical coating or filling. The present invention is particularly suited for the preparation of R-T-E pre-sweetened cereals. The coating formulations comprise less than 70% sucrose, corn syrup and 1-20% non-hydrated integrated starch and preferably about 5-10% insoluble mineral salts each of particle size of about 50 microns.

21 Claims, No Drawings

REDUCED SUCROSE SUGAR COATINGS FOR CEREALS AND METHODS OF PREPARATION

CROSS-REFERENCE TO RELATED APPLICATIONS

This application claims the benefit of priority under 35 U.S.C. 119(e)(1) of a provisional patent application, Ser. No. 61/360,555, filed Jul. 1, 2010, which is incorporated herein by reference in its entirety.

FIELD OF THE INVENTION

The present invention is directed generally to food products and to their methods of preparation. In particular, the present invention is directed to improved sugar coatings for breakfast cereals that are sucrose reduced; to finished pre-sweetened breakfast cereal products comprising such coatings; and to methods for making such coatings and coated finished cereal products.

BACKGROUND

Ready-to-eat ("R-T-E") breakfast cereals are popular packaged food items. R-T-E cereals exist in large numbers of varieties may be grouped into two broad categories, puffed and un-puffed cereals. Puffed cereals are well known and enjoyed both in adult cereals (e.g., fabricated from oat based cooked cereal doughs) and children's cereals (often prepared from more blandly flavored rice and/or corn based cooked cereal doughs). Un-puffed cereals include 1) flaked cereals (e.g., corn flakes, wheat flakes, rice flakes, mixed grain flakes), and to a lesser extent, 2) shreds (whether from whole grains or from cooked cereal doughs), 3) biscuits, including filled or unfilled, 4) shredded biscuits, including filled and unfilled, and 5) granola cereals.

Often, such products include various coatings usually comprising nutritive carbohydrate sweeteners such as sucrose, corn syrup, fructose, etc. Conventionally, presweetened breakfast cereals have been prepared by first producing unsweetened cereal pieces; coating the cereal pieces with an aqueous slurry or solution of sweeteners; and then drying the coated pieces in an oven or air current to remove the added moisture.

Pre-sweetener coatings typically comprise sucrose as their principle ingredient. However, since corn syrups are often (depending, for example, upon commodity pricing) less expensive than sucrose, packaged food manufacturers of pre-sweetened cereal products desire to replace or substitute at least a portion more expensive sucrose with a less expensive sweetening carbohydrate such as corn syrup or corn syrup solids. While advantageous from a cost standpoint, as the level of sucrose in the coating decreases and the level of corn syrups increase, the coating compositions becomes less crystalline, and more sticky and hygroscopic. While such properties may be desirable in application wherein a sugar syrup is used as a binder (e.g., for use in granola or cereal bars), such stickiness is undesirable in commercial breakfast cereal production. Stickier products are harder to handle in plant operations. Also, the end product is more hygroscopic and can tend to undesirable moisture absorption over time leading to an undesirably sticky product. Consequently, corn syrup substitution for sucrose is generally limited to about one part in five for an acceptable sugar coating formulation for the preparation of a pre-sweetened cereal.

Current consumer trends favor reduced sugar products. Generally, this reduced sugar attribute is interpreted as a reduction in sucrose. Thus, there is a desire for reduced sucrose containing pre-sweetened cereal products.

Of course, reduced sucrose containing products can be prepared simply by reducing the amount or ratio of sugar based pre-sweetener applied to the cereal base to lesser ranges. Typically, in a pre-sweetened breakfast cereal, the ratio of coating to base is about 1:1. Such reductions, however, come at the expense of reductions in other desirable cereal product attributes. For example, the sweetness perception is reduced. Also, the bowl life of the product in cold milk can be unacceptably reduced.

Also known are very low sugar pre-sweetened RTE cereals comprising coatings that include a high potency sweetener (See for example, U.S. Pat. No. 4,378,377, issued Mar. 29, 1983, entitled "Cereal Presweetened With Aspartame And Method Of Preparation", and U.S. Pat. No. 4,540,587, issued Sep. 10, 1985, entitled "Cereal Presweetened With Aspartame And Cold Water Soluble Gum Coating And Method Of Preparation", each to Gajewski). Such coatings generally comprise a high potency sweetener as the principle generally exclusive sweetener. The coatings generally additionally comprise gelatin or another gum dissolved in water that binds the high potency sweetener to the cereal after drying to remove the moisture added with the coating applications. While useful, such products enjoy only limited popularity due in part to the taste profile of such high potency sweeteners and some consumer resistance to such high potency sweeteners.

Still another approach is to provide a reduced calorie bulking agent such as polydextrose or sugar alcohols. While useful, polydextrose and sugar alcohols are several times more expensive than sugar and some materials can have an undesirable laxative effect especially in more sensitive individuals such as children.

In light of the difficulties of reducing the sucrose content of a pre-sweetened breakfast cereal while maintaining the benefits and eating qualities of conventional high sucrose level consumer food products, there is a continuing need for reduced sucrose coating formulations and finished pre-sweetened breakfast cereal products that minimize the degradation in processing, texture, bowl life, eating qualities, visual appearance that have accompanied reduced sucrose products in the past.

Surprisingly, the above needs can be met and improved reduced sucrose coating syrup formulations and dried pre-sweetened breakfast cereal products prepared employing such improved syrups can be provided. The present improved reduced sucrose coating syrup formulations comprise a reduced sucrose sugar syrup comprising additionally low levels of fine, insoluble filler materials such as a non-hydrated-starch, insoluble fiber, and/or an edible mineral in partial substitution for sucrose.

Inclusion of a non-hydrated filler starch is obtained by adding an insoluble starch material (e.g., un-gelatinized) to a concentrated sugar syrup before further heated evaporative concentration and maintaining the heated temperature to below the gelatinization temperature of the added starch. The concentrated syrup is low in moisture and thus constitutes a water sparing environment. Surprisingly, addition of a starch ingredient to moisture-sparse syrup can be accomplished without resulting in hydration of the starch. The starch acts as an inert filler with minimal adverse impact on the desirable pre-sweetened breakfast cereal product eating qualities and bowl life properties provided by a sugar pre-sweetener coating. As a result, such starch addition can be used to provide a 1:1 substitution for sugar or other syrup ingredients with minimal adverse organoleptic effects.

SUMMARY

In its principle product aspect, the present invention resides in improved sugar coatings useful in the preparation of topically pre-sweetened food products that are sucrose reduced whether in the form of a syrup or in the form of a dried coating. The syrup form is useful as an intermediate product in the preparation of pre-sweetened food products. In dry form, the present formulations can be a component part of a composite food product especially in the form of a topical coating or filling. The present invention is particularly suited for the preparation of R-T-E pre-sweetened cereals. The present formulations can comprise About 40-85% sucrose (dry weight basis);
About 10-25% non-sucrose soluble solids (dry weight basis);
About 1-20% non-hydrated starch having a particle 50 microns or less (dry weight basis); and,
About 5-12% edible mineral having a particle size of 50 microns or less (dry weight basis);
and wherein the sucrose crystallinity is less than 25%.

In one variation, the present formulations are in the form of a slurry syrup and range from about 10% -15% moisture. In another variation, the formulations are in the form of a solid and range from about 2% -5% moisture.

In its principle method aspect, the present invention resides in methods for preparing the present improved reduced sucrose sugar coating in syrup form. The syrup preparation methods comprise the steps a first step of A. Preparing a sugar make-up slurry comprising:
 About 40-85% sucrose (dry weight basis),
 About 10-25% non-sucrose solids,
 About 1-20% non-hydrated insoluble starch having a particle size of 50 microns or less,
 About 5-25% edible mineral having a particle size of 50 micron or less, and, sufficient amounts of water to provide the sugar make-up slurry with a moisture content ranging from about 15-20%;
B. heating the make-up sugar slurry with agitation to dissolve the sugar ingredients to below the gelatinization temperature of the starch about 75-121° C. (about 170-250° F.) to form a hot sugar slurry liquid;
C. evaporatively concentrating the hot sugar slurry liquid by maintaining the temperature at below the gelatinization temperature of the starch to form a cooked hot sugar slurry syrup having a moisture content ranging from about 8 to 15% and wherein the non-hydrated starch remains ungellatinized;
D. optionally cooling the hot slurry sugar syrup to a temperature of 162° F. (72° C.) or cooler to form a cooled hot hypocrystalline reduced sucrose content sugar slurry syrup about 40-85% of sugar components and having 25% or less crystallinity and 15% or less moisture.

In another product aspect, the present invention resides in comestibles or base, particularly R-T-E cereals, having a pre-sweetener coating comprising a fine non-hydrated starch. Notwithstanding the reduced sucrose content, the coating exhibits reduced stickiness and hygroscopicity. The coating is present in a weight ratio of coating to base ranging from about 1:2 to about 2:1 (dry eight basis). Non-hydrated starch is present in the coating at from about 1-20% of the coating. The coating additionally comprises about 40-85% sucrose, about 10-25% corn syrup. In certain embodiments the coating additionally comprises about 5-25% insoluble calcium minerals having a particle size of about 50 microns or less.

In another method aspect of one and the same invention, the present invention resides in methods for preparing a dried coated comestible with the present improved reduced sucrose sugar coating syrup. The syrup preparation methods comprise a first step of providing pre-sweetener slurry that essentially includes non-hydrated starch and calcium mineral. Thereafter, the methods include a step of topically applying the pre-sweetener slurry to a quantity of a dried cereal base having a moisture content of less than about 5% to form an enrobed comestible. The weight ratio of slurry mixture to cereal base essentially ranges from about 1:2 to about 2:1. The methods further include the step of drying the enrobed comestible to a final moisture content of less than about 5.0%.

DETAILED DESCRIPTION OF THE INVENTION

The present invention is directed to improved sugar coatings for breakfast cereals that are sucrose reduced comprising non-hydrated starch; to pre-sweetened breakfast cereal products comprising such coatings; and to methods for making such coatings and coated finished cereal products. The present methods have particular utility in the provision of presweetened R-T-E cereals. Each of the product ingredients and product features and steps of the present methods are described in detail below.

Throughout the specification and claims, percentages are by weight (dry weight basis) unless otherwise indicated and temperatures in degrees Centigrade unless otherwise indicated. Each of the referenced patents or patent applications is incorporated herein by reference.

The present invention provides improved reduced sucrose coating formulations whether in dry form as a coating on a finished food product or in liquid forms as a reduced sucrose sugar syrup. The pre-sweetener coating formulations comprise a low sucrose sugar slurry additionally comprising low levels of fine, insoluble filler materials such as a non-hydrated-starch and/or an insoluble fiber in partial substitution for sucrose. The improved reduced sucrose coating formulations provide pre-sweetener coatings for pre-sweetened comestibles that mimic conventional sucrose rich syrups in taste, appearance, bowl life and texture notwithstanding being highly hyposcrystalline. The coatings and coated food products exhibit reduced stickiness and hygroscopicity compared to coating formulations of equivalent levels of sucrose crystallinity. The present products find particular suitability for use for breakfast cereal added components to children's ready-to-eat breakfast cereals.

In one variation, the present formulations are in the form of a reduced sucrose sugar slurry and range from about 8-12% in moisture. The slurry form is useful as an intermediate product in the preparation of pre-sweetened food products. In another variation, the formulations are in the form of a solid and range from about 1% -5% moisture such as formed from drying the present slurry after having been applied to a food base. In dry form, the present formulations can be a component part of a composite food product especially in the form of a topical coating or filling. The present invention is particularly suited for the preparation of R-T-E pre-sweetened cereals.

In other embodiments, the reduced sucrose, starch filled slurrys find utility for use as binder syrups for shelf stable food products such as granola bars or cereal bars.

The present reduced sucrose sugar slurry can comprise about 50-70% sucrose (dry weight) as its principle sugar. It will be appreciated that such sugar slurries are "sucrose reduced". "Sucrose reduced" as used herein is meant that the sugar slurrys or dry coating made therefrom contain 70% sucrose or less inasmuch as conventional breakfast cereal pre-sweetener formulations typically comprise 80% or greater sucrose. Traditional pre-sweetener coatings contain about 80-95% of a sucrose component as the principle ingredient.

The present reduced sucrose sugar slurry can comprise about 10-30% non-sucrose soluble solids. In one variation, such second non-sucrose ingredient can be supplied by one or more supplemental or secondary non-sucrose sugars or nutritive carbohydrate sweetening ingredients. By "sugar" as meant herein are common non-sucrose nutritive monosaccharides sweetening agents such as glucose, dextrose and fructose but also such poly-saccharides as found in corn syrup, corn syrup solids or other grain syrups (e.g., molasses, barley syrups, oat, tapioca, maltose syrups). Nutritive carbohydrate sweetening ingredients include those such as monosaccharides such as dextrose (e.g., anhydrous, monohydrate or dextrose syrup) fructose, tagatose, mannose, and galactose, and other non-sucrose disaccharide sugars such as, maltose, trehalose, and lactose, as well as hydrolyzed starch syrups such as corn syrup which include dextrin, maltose and dextrose, invert sugar syrups which include levulose and dextrose and/or converted fructose or glucose syrups. In other less preferred variations however, all or a portion of the saccharide component can be supplied by impure or flavored saccharidic ingredients such as fruit juices, purees, honey nectars, concentrated fruit. Nutritive carbohydrate sweetening ingredients include those such as monosaccharides such as dextrose (e.g., anhydrous, monohydrate or dextrose syrup) fructose, mannose, and galactose and disaccharide sugars such as maltose, trehalose, and lactose, as well as hydrolyzed starch syrups such as corn syrup which include dextrin, maltose and dextrose, invert sugar syrups which include levulose and dextrose and/or converted fructose or glucose syrups, dextrose, fructose, crystalline fructose, lactose, malt syrup, malt syrup solids, rice syrup solids, rice syrup, sorghum syrup, invert sugar, refiners syrup, corn syrup, corn syrup solids, maltose, high fructose corn syrup, honey, molasses. The nutritive carbohydrate component as described herein is most commonly provided by such nutritive carbohydrate sweetening ingredients as extra fine ground sugar and corn syrup. In other variations however, all or a portion of the saccharide component can be supplied by impure or flavored saccharidic ingredients such as fruit juices, purees, honey nectars, concentrated fruit juices, fruit flavors and mixtures thereof. In some low sugar syrups, some of this soluble saccharide component used in the syrup can also be replaced with other soluble ingredients like soluble fibers, such as polydextrose, fructo-oligosaccharides, xylo-oligosaccharides, galacto-oliosaccharides, and soluble corn fiber.

Soluble "oligosaccharides" can be used in full or partial substitution for the supplemental or secondary sugars. "Oligosaccharides" as used herein describes a molecule containing two to twenty sugar units joined by glycosidic bonds. The soluble fiber inulin, is an example of an fructo oligosaccharide ("FOS") useful herein as a supplemental soluble sugar. If employed, addition of such FOS materials can range from about 0.1% to about 15% of the sugar slurry (dry weight basis). In certain variations polydextrose can also be used.

In preferred variations, the present reduced sucrose formulations are desirably free (i.e., comprise 0.5% or less) of any ingredient from the family of bulk sweeteners known as polyols or sugar alcohols such as sorbitol, xylitol, lactitol, erythritol, and/or maltitol. Avoidance, or at least minimization, of the use of such ingredients is especially desirable for products formulated intended for children due in part to the laxative side effects that consumption of such ingredients can aggravate.

The present sugar reduced slurries comprise about 1-20% of a fine non-hydrated filler starch component in particulate form. The skilled artisan will appreciate that this level of filler starch is above and beyond any levels of syrup starch and/or topically applied or dusting starch employed herein, if any. As a result, the cumulative starch levels in the coating can range broadly from about 1-40% provided at least 1-20% of the coating is in the form of the present non-hydrated filler starch.

"Non-hydrated starch" as used herein refers to starch that has not either absorbed water or gelatinized or both. Non-hydrated starch acts as an inert filler that replaces sugar, yet provides substance and structure to the finished slurry. The skilled artisan will recognize that the present filler starch can be compositionally similar to syrup starches (i.e., those starches are that are added to the slurry and which are hydrated during the slurry cooking and concentration step) and/or dusting starches. However, importantly herein, the present compositions are defined in important part by additionally describing the location (distributed evenly in the amorphous saccharide phase and in the form of discrete particles) rather than homogeneously dissolved in the sugar slurry as a result of gelatinization.

While not wishing to be bound by the proposed theory, it is speculated herein that in a conventional high sucrose pre-sweetener coating such as for cereals, that such coating will have typically about 25% sucrose crystals embedded in a typically 70% sucrose-mixed sugar glass or amorphous phase. However, as the concentration of sucrose in the coating is reduced and replaced with corn syrup, the sucrose crystal percentage decreases, i.e., becomes more hypocrystalline, resulting in increasing glossiness of the coating as well as undesirable stickiness and hygroscopicity. In the present invention, the sucrose crystal percentage reduction that otherwise accompanies reduction in sugar concentration on the sugar coating (and syrups there for) can be at least partially compensated for by substituting particles of non-gelatinized or non-hydrated starch that mimic certain of the important physical properties of crystalline sucrose.

Suitable non-hydrated starch components can be provided by any convenient material including starches derived from common major cereal grains such as corn (maize), wheat, barley, rice, oats and mixtures thereof. In less preferred embodiments, the starch can be provided by various tuber sources such as tapioca, potato, cassava or from minor cereal grains such as amaranth, triticale and the like are also known and can be used as well as heritage grains. The grain materials can also be supplied in whole or in part by such minor or "heritage" grains such as spelt, kamut, quinoa and mixtures thereof. While not produced in large quantities, such minor and/or heritage grains are especially popular among those interested in organic foods. Of course, both organic and conventional sourced starch materials are contemplated herein. Native corn starch is preferred because of its functionality, price and availability.

Also useful herein to provide the non-hydrated starch ingredient are low protein flours (i.e., having a protein content of less than about 7%). At higher protein levels, such flour ingredients' protein can gum up the resultant slurry. Also, whole grain flours are not preferred inasmuch as the additional germ fractions can also degrade the slurry.

While whole flours and processed flours can be used in substitution for the present preferred starch materials, such use is less preferred since the bran fraction can impart an undesirable speckled appearance to the finished product. Of course, if such an appearance attribute is nonetheless acceptable, e.g., in a highly colored product, such materials can be used in full or partial substitution for the present starch materials.

In still other variations, all or a portion of the non-hydrated starch can be substituted by a fiber source, that is substantially insoluble. Fiber materials can include bamboo fiber, cellulose, various brans (e.g., from rice, corn, wheat, and mixtures thereof), cottonseed, oat fiver, sugar cane fiber, wheat fiber, soy fiber, and mixtures thereof. Brans that include significant soluble fiber components (such as from oats or barley) should be avoided. Desirably, such materials are selected from those having a white or at least a light or blonde color. Corn bran is a preferred bran source in view of its low cost, color, wide availability and consumer acceptance.

Importantly, such substitute materials for starch are of the selected particle size and appropriate care is to be taken such as taught herein to insure that the evaporative concentration step is practiced at temperature below the gelatinization temperature of any starch ingredient (or component of any ingredient such as bran fibers) so as to minimize any hydration of the filler ingredients. If the temperature of the dissolution or evaporative cooling steps is too high, then the fiber filler ingredients will eventually undesirably hydrate and thicken the slurry. Thus, fiber filler bearing sugar slurries have a limited pot-life before they can no longer be successfully.

Non-hydrated starch is significantly different from "dusting starch" or topically applied insoluble fiber materials. Non-hydrated starch is incorporated into the slurry or coating provided therefrom whereas "dusting starch" is merely topically applied. Addition of non-hydrated starch at the desired concentrations can only be achieved by incorporation into the slurry by slurry cooking (but at below starch gelatinization temperatures); not by mere topical application. Non-hydrated starch is incorporated into the concentrated sugar slurry at levels up to 20% without significantly altering the physical properties of the concentrated slurry. Microscopic visual examination can be used to easily distinguish between integral non-hydrated starch and mere dusting starch.

The filler starch can also be supplied by more costly modified starches or by digestion resistant starches although such materials are less preferred due to their extra expense. (A good description of such materials can be found in U.S. Pat. No. 7,648,723 "Production Of Low Calorie, Extruded, Expanded Foods Having A high Fiber Content" issued Jan. 19, 2010 U.S. 20090214718 published Aug. 27, 2009 "Fiber Fortified Cereals, Cereal Bars And Snacks And Methods For Making" by Leusner). However, less costly materials such as maltodextrins should be avaoidedsince maltodextrin addition can lead to undesirably high viscosity levels in the reduced sucrose slurries In preferred embodiments, the starch filler material is ground to a particle size sufficiently small to provide a non-gritty texture to the finished product. Good results are obtained when the filler starch has a mean particle size of 50 microns or less (≤50 µm). Better results are obtained when the filler starch or filler material ranges in particle size from about 2-50 microns (µm), preferably about 5-25 µm.

Since the present filler starch will most often be used to reduce the amount of sugars such as the finished present reduced sucrose products can have a modestly reduced sweetness taste compared to comparable products of the prior art with which the customer will be familiar. While generally unnecessary, if nonetheless desired, the present products can additionally comprise added or supplemental high potency temperature resistant sweeteners or sweetness enhancers to increase the sweet taste to familiar levels. These added high potency sweeteners can be added to the slurry, blended with the present filler starch or other filler carbohydrate ingredient(s), and/or blended with the dusting starch. Sugar reduced slurrys can comprise an effective amount of a heat tolerant high potency sweetener, particularly in the enrobing or dusting starch. Such high potency sweeteners include potassium acesulfame, sucralose or mixtures thereof. Use of such high potency sweeteners is often desired to enhance product sweetness. Sucralose is preferred for use herein since acesulfame K (colloquially, "Ace K") can impart a bitter taste to some consumers sensitive to potassium. Alitame, neotame, saccharin and cyclamates can also be employed but price, availability, consumer acceptance and governmental regulations all effect their selection for use. Thaumatin can also be used and provides the advantage of flavor masking off flavors. In other variations, the products can employ supplemental "natural" or plant sweeteners such stevioside such as from ground stevia leaf, stevia extract (an herb, *Stevia rebaudian*, native to Peru and Paraguay popular under the Truvia brand by Cargill Inc.) or essence or tincture of *Rubus suavissimus*. Such products are used at amounts effective to provide desired sweetness levels. Other sweetness enhancers and derivatives of that can be used include; glycyrrhizin, neohesperidine dihydrochalcone, mogroside, monellin, mabinlin, pentadin, brazzein, and curculin. Such materials are often blended with or formed into powder form by mixing with a solid substrate or carrier such as a starch or maltodextrin. While not temperature stable per se, the sweeteners can be added at levels that compensate for losses during processing. In preferred embodiments, heat sensitive high potency sweetener ingredient materials can be added to the cooled slurrys so as to minimize any loss due to exposure to elevated temperatures. Generally, such products are used at levels ranging from about 0.001% to about 1% depending upon the sweetening power of the active ingredient and concentration of the active ingredient in the sweetener ingredient. Preferred for use are sucralose, acesulfame, and mixtures thereof since such sweeteners are more tolerant of the manufacturing process than the plant derived sweeteners.

The present coating formulations can further comprise a wide variety of supplemental materials to improve the organoleptic, visual, and/or nutritional properties of the finished reduced sucrose products. Useful materials include, for example, colors, fats, flavors, preservatives, nutritional fortifying ingredients (e.g., vitamins, minerals, nutraceuticals, etc.) and mixtures thereof. If present, such optional materials can collectively comprise from about 0.01% to about 25% by weight of the present products, preferably about 0.1-10% and for best results about 1-5%.

The reduced sucrose food product compositions and products prepared therefrom can further comprise an insoluble bulking ingredient as a bulking agent. More preferably, any insoluble component such as a fortifying ingredient (e.g. calcium carbonate or a calcium phosphate salt for calcium fortification) is added in the form of a fine powder having a particle size such that 90% has a particle size of less than 50 micron, preferably 40 μm or less in size and for best results under 10 microns. Employment of such calcium bulking ingredients also provides a secondary advantage of calcium fortification.

Useful herein are calcium ingredients that supply at least 20% of their weight in elemental calcium. Preferred for use herein are calcium ingredients selected from the group consisting of food grade calcium carbonate, ground limestone, calcium phosphate salts and mixtures thereof. Such calcium phosphate salts provide high levels of calcium and are relatively inexpensive. Moreover, such calcium phosphate salts can be used to provide calcium at high fortification levels with an acceptable taste. Calcium phosphate is generally available as a monobasic $(CaH_4(PO4)_2.H_2O)$, dibasic $(CaHPO_4.2H_2O)$ or tribasic $(Ca_3(PO_4)_2)$ salts. Preferred for use herein is tricalcium phosphate, $Ca_3(PO_4)_2$, ("TCP") because of its high weight percentage of calcium (about 38%). Such added calcium ingredients can collectively comprise about 0.1-10%, preferably about 5%-10% of the coating formulation, most preferably about 5-7%. In certain embodiments, the ratio of non-hydrated starch to mineral ingredient ranges from about 1:1 to 2:1.

The reduced sugar coating formulations products are fabricated from compositions that essentially comprise about 40-85% of total saccharides and about 1-15% of a non-hydrated starch polysaccharide component In one preferred embodiment, the improved sucrose reduced coating formulations compositions are fat free, i.e., have added fat contents of less than 5%, preferably less than 1% (dry weight basis). However, low fat reduced sugar coating formulations are contemplated for use herein. In these embodiments, the added fat level can range from about 0.1-15%, preferably about 1-5% of the coating formulation. In such variations, e.g., chocolates, the formulation the added fat component can be homogeneously blended with the other components. Such added fat ingredients can comprise, for example, cocoa butter, dairy fat or dairy fat containing (e.g., cheese) or other edible fatty triglyceride or fat mimics such as sucrose polyesters. In still other variations, the fat can be in the form of 1-10% of the coating of emulsified oil droplets.

The sugar reduced coating compositions can be optionally flavored and/or colored to provide uniform products or products having phases of variously colored and flavored potions especially those coating compositions intended for use in connection with children's breakfast cereals. By "color" is meant any color, including white, which can be provided by the base ingredients, and by additional artificial or natural coloring agents. "Color" also includes various hues or shades, e.g., pink and red. The slurrys can additionally comprise about 0.1-5% salt. In another variation, the coating can additionally comprise a cocoa to provide a chocolate flavored coating Method of Preparation The invention further provides methods preparing the present improved reduced sucrose sugar coating in slurry form. The methods can includes a first step of preparing a sugar make-up slurry comprising about 40-85% sucrose (dry weight basis), about 1-20% secondary nutritive carbohydrate sweetening ingredient such as corn syrup solids, about 1-20% non-hydrated insoluble starch having a particle size of 50 microns of less, and, sufficient amounts of water to provide the sugar make-up slurry with a moisture content ranging from about 8-30%, preferably about 15-20%. While higher moisture levels can be practiced, e.g., up to 30% or even 40% moisture, such higher moisture content sugar slurrys are less preferred inasmuch as such higher levels of moisture would require even more slurry concentration or subsequent drying to remove the additional moisture. Also, when slurries having higher moisture content levels, greater care should be exercised to avoid undesirable gelatination of the starch in the slurry. sugar make-up slurry can also include calcium bulking ingredients, 1-10% insoluble fiber.

The methods can include second step of heating or cooking the make-up sugar slurry with agitation to dissolve the ingredients to below the gelatinization temperature of the starch to form a hot sugar slurry liquid. Due to the high soluble solids concentration and low moisture, heating the slurry can be to temperatures above the nominal gelatinization temperatures of the starch in a more dilute, higher moisture level slurry. Good results are obtained when the heating step is practiced at a slurry moisture content of 8-25% and slurry temperature ranging from about 170-250° F. (about 75-121° C.), preferably about 221-239° F. (about 105-115° C.) so as to avoid gelatinization. The heating step can be conveniently practiced using a using scraped surface heat exchanger such as a scraped surface heat exchanger such as a Votator by Waukesha Cherry-Burrell.

The method can include a third step of evaporatively concentrating the hot sugar slurry liquid by maintaining the temperature at below the gelatinization temperature of the starch to form a concentrated cooked hot sugar slurry syrup. Good results can be obtained when the starting moisture content of the sugar slurry, as indicated above, is about 15-25% and wherein the concentrated sugar slurry has a finish moisture content ranging from about 8-15% and wherein the non-hydrated starch remains un-gelatinized.

The method can include a step of cooling the hot concentrated sugar slurry syrup to a temperature of 162° F. (72° C.) or cooler to form a cooled concentrated sugar slurry syrup about 40-85% of sugar components and having 25% or less crystallinity and 8-12% moisture. Other minor ingredients such as color, flavor, nonnutritive or artificial sweeteners or nutritional fortifying ingredients or combinations thereof be additionally be admixed into the cooled concentrated low sucrose sugar slurry comprising non-hydrated starch materials.

As noted above, it is important to practice the heating/cooking and, if practiced, evaporative concentration steps at temperatures below the gelatinization temperature of any added starchy constituents. For example, in prior art confection formulations, a sugar slurry is prepared to include about 1-5% of a starch ingredient. When the syrup is boiled (i.e., heated to above the non-hydrated gelatinization temperature of the starch in a high moisture solution), some of the starch will undesirably gelatinize or cook thereby thickening the syrup, i.e., will become hydrated. The hydrated starch loses its particle identity and becomes dispersed within and part of the amorphous saccharide phase.

Even modest hydration and gelatinization of the starch greatly increases the viscosity of the syrup and can even produce an unusable taffy-like consistency. Such a taffy-like material cannot be concentrated or to produce the desired finished compositions herein.

A conventional steam jacketed kettle and an electric or pneumatic mixer or a common food application steam heated screw conveyor can be used to mix and heat the slurry. Those skilled in the art can appreciate that any heating and mixing system can be used to create a hot sugar slurry.

As used herein "crystallinity" generally refers to the crystal content of finished syrups. The crystals are typically sucrose crystals, but can be the crystalline form of any nutritive carbohydrate sweetener used to create the starting slurry. An indication of the degree of crystallinity of the starting slurry is cloudiness. After dissolving the starting materials the hot slurry is typically clear, as the slurry cools crystallinity increases and the slurry appears cloudy. Finished syrups containing non-hydrated starch can have a crystallinity range of 0-30%, with the best range of crystallinity occurring between 15-30%, with a preferred range of 22-28% crystallinity.

Unlike dusting starch, filler starch ingredient is seen to be evenly distributed throughout amorphous continuous phase. Filler starch can also be seen to partially replace a portion of sugar crystals as well as the amorphous continuum. Filler starch is further seen to be in the form of discrete particles rather than as uniformly blended into the amorphous continuous sugar phase.

In other embodiments, the first step of syrup preparation can be practiced in a single unit operation such as when practiced employing a cooker extruder such as a twin screw extruder. In still other variations, one or more sub-steps can be practiced using single pieces of equipment.

In one variation, an initial make-up or starting syrup is prepared having a moisture content of about greater than about 15-25% and about 0-20% crystallinity. This initial or start-up sugar syrup can then be heated to about 235-255° F. (~112-124° C.), preferably about 245-255° F. (~112-124° C.) and for best results about 250° F. (~121 ° C.) with moisture removal (such as by boiling in an open atmosphere vessel or in a evaporator) to provide a hot concentrated syrup having a moisture content of about 8-15%. The hot concentrated syrup is preferably clear, i.e., having 0% crystallinity. Thereafter, the hot concentrated sugar syrup can be cooled to about 170-220° F. (~77°-104° C.) to form the cooled concentrated sugar syrup of a desired crystallinity value.

In another embodiment, the sugar slurry preparation step can be practiced in several subs-steps. In this embodiment, the order of addition of ingredients is practiced so as to allow for partial dissolution of the sucrose and non-sucrose soluble solids in the make up water prior to the addition of the non-hydrated insoluble starch ingredient. By practicing this order of addition, the moisture is not available to hydrate the starch even when modestly heated. In one variation, the sugar slurry preparation step can include a first sub-step of admixing the sucrose ingredient, the non-sucrose soluble solids ingredient and sufficient amounts of make-up water to form a base slurry having a moisture content of 8-25%. This base slurry will have some amounts of sucrose and/or non-sucrose ingredient dissolved but also a portion that is undissolved. The step can additionally include a sub-step of admixing the starch ingredient and the any insoluble mineral ingredient to the sugar base slurry to form a sugar and starch slurry. The step can then include a first heating sub-step of heating the sugar and starch slurry with agitation to a temperature up to about 185° F. to further partially dissolve the sucrose and non sucrose ingredient(s) to form a warm sugar and starch slurry wherein the starch is essentially ungelatinized. In another variation, the step can additionally include a second heating step immediately prior to application of the slurry to the food base. In this variation, the warm sugar and starch slurry can be heated to up to 200-250° F. and immediately thereafter applied to the food base.

An embodiment of the present method of preparation provides methods of preparing coated food products with the present coating formulations. These methods can further comprise the step of providing a base of dried food pieces which can be charged or fed to an enrober. The food pieces could be of any food type which is desired to be provided with a sweetened coating and include, for example, RTE cereals, puffed popcorn or other grains, nuts, candies, and the like. The present methods find particular utility in providing R-T-E cereals with a presweetened coating. In the following detailed description of the present invention, even though particular reference is made to a base comprising R-T-E cereals, it is understood that the present invention also finds wide application in provision of other food items wherein fortification reduced sucrose pre-sweetener coating is desired.

The base can be, for example, a cereal piece fabricated from a dried cooked cereal dough or from a cooked cereal grain. Cereal base pieces can be provided in another number of configuration or form including, for example, flakes or puffs, shreds, biscuits, mini biscuits, cornucopia, ring shaped pieces shredded biscuits or the like. Both flakes and expanded breakfast cereal pieces are contemplated. The present invention finds particular utility in the coating of puffed cereals. Such cereal particles are prepared in the usual manner and may be either toasted or untoasted.

In one embodiment, the present invention provides improved pre-sweetened high fiber RTE cereal of that contain high levels of fiber and insoluble solids with low calories to significantly reduce undesired textural and taste attributes associated with fiber in cereal foods. The present invention provides high fiber finished RTE cereal products improves taste and texture by applying fiber on the surface of the base cereal pieces rather than incorporation of the entire fiber amount as an ingredient in the cooked cereal dough from which the base is fabricated especially puffed RTE cereal base pieces. High levels of soluble and insoluble fibers and inert solids such as calcium carbonate can be topically applied in a reduced sucrose coating slurry to replace all or part of the fiber that otherwise is provided by fiber ingredients in the cooked cereal dough of the base. Such topical substitution can ameliorate negative textural attributes that otherwise can be present with high levels of fiber in the cereal base. It is theorized herein that fiber, especially at high levels, can interrupt the starch matrix structure of the cooked cereal dough of the base and thus interfere with the expansion of a starch/flour based product. By the present method, the grittiness and dryness of a high fiber base can be significantly reduced and expansion of the base improved. The present reduced sucrose slurry also prevents dilution of fiber and keeps calories low in the overall product. Another benefit is to be able to impart sweetness through slurry without having to add as many calories. Consequently, the present finished products surprisingly provide a high fiber product that has significantly better organoleptic attributes such as taste and texture than a compositionally similar product that has all of the fiber included in the cooked cereal dough from which the base pieces are fabricated.

It is important to appreciate that by the present methods, the coating fiber is incorporated into the coating slurry. Such integral fiber is physically distinguished from a "dusting starch" or insoluble fiber ingredient that is merely adhered to the cereal base piece using a coating as a binder. Also, by employing the present method, whereby the added fiber is cooked (but below gelatinization temperatures) and integral to the slurry and by employing an insoluble calcium mineral ingredient at high levels (5% or more) of particular particle size, a reduced sucrose level coating can be provided that is less sticky or tacky can be provided notwithstanding the very hypocrystalline (25%≥vol./vol.) nature of the formulation. The reduced stickiness of the coating provides not only benefits to the finished food product being less hygroscopic but also provides operational advantages during manufacturer by reducing cleaning and by reduced clumping during manufacture.

The present invention provides sugar reduced improved food products that mimic their full sugar containing counterpart products in taste, appearance, bowl life and texture. The present products find particular suitability for use as added components to children's presweetened ready-to-eat breakfast cereals or snack products or as ingredients to shelf stable food products such as granola bars.

The sugar free and sugar reduced syrups can also be used in regular or reduced sugar versions of cereal bar products, toppings for reduced sugar ice cream or yogurt, or on various reduced sugar baked goods. The present compositions can also be used as an ingredient or phase of other composite syrups or candy products.

Any conventional puffed cereal or method of preparation can be used herein to provide a puffed cereal base. The art is replete with such compositions and their methods of preparation and the skilled artisan will have no problem selecting suitable compositions or methods of preparation. Exemplary compositions and methods of puffed cereal preparation are found in, for example, U.S. Pat. Nos. 3,464,827, (issued Sept. 2, 1969 to T. Tsuchiya, et al.); 3,600,193, (issued Aug. 17, 1971 to E. F. Glabel, et al.); 3,246,990, (issued Apr. 19, 1966 to Thompson, et al.); and 3,687,687, (issued Aug. 29, 1972 to A. L. Liepa), each of which is incorporated herein by reference.

Particularly useful herein are smooth puffed pieces such as puff base or "O" or ring shaped pieces. Such pieces can be fabricated from cooked cereal doughs containing oats, corn, wheat, rice, barley, and mixtures thereof and blends of such pieces. Minor cereal grains such as amaranth, triticale and the like are also known and can be used. The present invention finds particular suitability for use in connection with ring shaped puffed pieces fabricated from oat based cooked cereal doughs. The present application also finds particular suitability for use in connection with complexly shaped puffed pieces fabricated from corn based cooked cereal doughs. More particularly, the present invention finds suitability for those fruit flavored and nonflavored topically presweetened R-T-E cereal products sold under the Trix® and Kix® brand names.

Prior to application of the pre-sweetener coating, the base pieces themselves typically will have density ranging from about 0.15 to 0.5 g/cc, preferably about 0.2 to 0.3 g/cc. Due to the various shapes and their packing factors, the bulk densities of quantities of the base prior to coating will range from about 0.05 to 0.25 g/cc.

In certain variations, the base can comprise and be prepared from a cooked cereal dough having a little or no calcium content. For example, the cooked cereal base can comprise expanded pieces such as are prepared by direct expansion from an extruder. In certain particular variations, the expanded cereal pieces can being characterized as having a complex shape such as in those pieces depicted in Des 339,443 and 339,444. By complex shape is meant those shapes intended to resemble for example a shaped object such as a figurine, an animal, a vehicle, and a fruit. In certain variations, such cereal base pieces are not uniformly colored but rather are characterized by portions being of more than one color. For example, a pieces intended to be reminiscent of a raspberry can have one or more portions each of red or blue.

For those food products requiring low moisture contents, it is important that any drying operation is performed prior to the coating of the pre-sweetener coating. Typically, for example, puffed cereal bases must be dried to relatively low moisture contents in order to have the desired crispness or frangibility. Thus, when a puffed cereal is the food base in the present methods of preparation, it is preferable to dry the puffed cereal base pieces to a moisture content of less than about 4%, and preferably less than about 3%, prior to the application of the pre-sweetener coating.

Any conventional drying technique can be used to reduce the moisture content of the cereal base pieces. The drying can be accomplished using equipment such as a rotary bed, tray, or belt dryers. Simple hot air convection drying, e.g., 200-280° F. (93.3 to 137.8° C.), is the preferred technique for practicing the present cereal piece drying. Of course, in certain applications, e.g., the provision of puffed cooked cereal dough pieces by direct expansion from a cooker extruder, the moisture content may be of suitable range without the need for a separate drying step.

In the present method of preparation, the next step in sequence is to coat or to enrobe the dried cereal pieces with the reduced sucrose pre-sweetener coating slurry containing non-hydrated starchy materials. The slurry essentially comprises about 4-30% moisture, about 0.5-10% insoluble calcium and the balance nutritive carbohydrate sweeteners.

Conveniently, this step can involve the sub-steps of (1) providing a sugar syrup; (2) admixing an aqueous calcium dispersion to the sugar syrup to form a calcium containing pre-sweetener coating blend; and, immediately thereafter, (3) applying the coating blend onto the cereal base.

The first substep can involve providing a sugar(s) syrup. The term "sugar syrup" is used in the art as a general collective term that includes both sugar syrups (i.e., no solids or oil components) as well as other compositions that include an oil component, whether or not emulsified, and/or solids. Generally, such sugar syrups comprise:

| Ingredient | Weight % | Preferred Range |
| --- | --- | --- |
| Sucrose | 40 to 70% | 50 to 65% |
| Corn syrup | 1 to 30% | 10 to 20% |
| $CaCO_2$ | 5 to 10% | 5 to 7% |
| Moisture | 4 to 30% | 4 to 10% |

A first or make up kettle, can be used to prepare in batch fashion a sugar syrup.

Conveniently, this sugar syrup is fed to a use kettle that can supply a continuous stream of the sugar syrup to a concentrator. The concentrator is heated such as by steam and in turn heats and concentrates the sugar syrup to by driving off water vapor to provide a concentrated sugar syrup of desired temperature, pressure and concentration. Also, the moisture concentration of the sugar syrup can be adjusted to anticipate the moisture added by the aqueous calcium slurry and/or other slurry additives to achieve desired moisture levels in the slurry upon application to the base.

In other variations, the provision of concentrated sugar syrup can be practiced in a single vessel or in various equipment as desired.

The sugar syrup is generally applied to the cereal base at temperatures of about 203-257° F. (95-125° C.).

In certain variations, the present coated products can include fruit flavors. For such products, the topical coating solution can optionally and preferably further comprise minor levels an edible organic flavor enhancer suitable for as the edible organic acid is ascorbic acid, malic acid, tartic acid, citric acid and mixtures thereof. Employment levels can be adjusted upwards to accommodate modest "neutralization" of the acidulant by the calcium ingredient. Useful collective levels of such acids can range from about 0.001-0.0025% (dry weight), preferably about 0.0012-0.0018%.

A frosted appearance can also be provided by adding, and in preferred embodiments, the coating composition additionally comprises, small amounts of titanium dioxide ($TiO_2$). Suitable $TiO_2$ concentrations range from about 0.02% to about 0.5% of the coating composition. Addition of a powdered white pigment is preferred to addition of a crystalline sugar or other sugar manipulation so as to provide not only a pleasing initial frosted appearance but also the benefits of resistance to dissolution in milk. Indeed, in highly preferred variations, addition of crystalline sugar to the enrober is avoided during the coating step.

The pre-sweetener coating is then applied to the pieces of the cereal base to form a coated base wherein the weight ratio of dried base pieces to coating ranges from about 10:1 to 0.5:1 to form the coated pieces, preferably about 2:1 to about 1:2. In the present method, the pre-sweetener coating can be applied to the cereal pieces, for example, using an enrober drum or other coating vessel or equipment while the pre-sweetener coating is at an elevated temperature and thus fluid. The temperature of the pre-sweetener coating—can be at a temperature of between about 200-300° F. (93.3-148.8° C.), preferably 212-300° F. (100-148.8° C.), and more preferably between 220-270° F. (104.5-132.2° C.).

Any conventional enrobing apparatus and technique can be used to practice the present enrobing or application step. Generally, a useful technique involves tumbling. The comestible piece(s) and hot concentrated coating formulation are each charged in any order to a rotating drum and tumbled for a sufficient time to achieve an even distribution of the suspension on the comestible.

In another variation, particulate matter can be added to the enrober for adhering the particulate matter to the external surface of the R-T-E cereal pieces. Particulate matter can include fruit pieces, granola, seed or nut bits, candy bits, additional bran, baby oat flakes, and mixtures thereof. The particulate material upon finish drying of the R-T-E cereal adheres to the external surface due to the coating action of the sugar slurry. Particulate matter can be added in a weight ratio of particulate matter to cereal base ranging from about 1:100 to about 25:100, preferably about 5:100 to about 15:100.

Desirably, the finished cereal base coated with the pre-sweetener coating is at moisture contents ranging from about 1-5% to provide shelf stable storage. Conventionally, the coated base having been coated with a pre-sweetener coating is subjected to a drying step, and the present methods can comprise such drying step, in a drier for times sufficient to reduce the moisture content to such desirable levels. The drying step functions to remove the moisture added with the pre-sweetener coating.

In certain embodiments, however, the pre-sweetener coating can be at sufficiently low moisture content (i.e., under 5% moisture) such that post coating application drying is minimal or even unnecessary.

If desired, the dried R-T-E cereal pieces can be thereafter fortified with an exterior or topical application of heat sensitive vitamins. A vitamin(s) dispersion is topically added to the cereal base such as by tumbling to form a vitamin fortified finished presweetened R-T-E cereal. Of course, the topical application of beta carotene is less preferred for the stability and appearance concerns discussed herein. Vitamin C beta carotene and other heat labile vitamins can optionally be sprayed onto the cereal pieces after the drying step.

After finish drying, the sugar coated pieces, optionally vitamin fortified, are allowed to cool to ambient temperature and then subsequently packaged and distributed in conventional manner. No further drying is required since the amount of added moisture from topical vitamin application is small.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A pre-sweetener reduced sucrose hypocrystalline sugar slurry coating syrup, comprising:
   40-70% sucrose (dry weight basis);
   10-35% non-sucrose soluble solids;
   1-20% non-hydrated insoluble starch having a particle size of 50 microns or less;
   0.1% to about 15% of a finely milled insoluble fiber; and,
   8-25% moisture.

2. The pre-sweetener sugar slurry coating syrup of claim 1 additionally comprising about 5% to about 25% of an edible insoluble mineral.

3. The pre-sweetener sugar slurry coating syrup of claim 2 wherein at least a portion of the edible-insoluble mineral is calcium carbonate.

4. The pre-sweetener sugar slurry coating syrup of claim 2 wherein at least a portion of the starch ingredient is provided by a whole grain flour ingredient.

5. The pre-sweetener sugar slurry coating syrup of claim 1, wherein at least a portion of the non-hydrated starch is supplied by an insoluble cereal grain bran.

6. The pre-sweetener sugar slurry coating syrup of claim 1, wherein the non-hydrated insoluble starch is in the form of discrete particles that remain as discrete particles in the pre-sweetener reduced sucrose hypocrystalline sugar slurry coating syrup.

7. A pre-sweetener reduced sucrose hypocrystalline sugar slurry coating syrup, comprising:
   40-70% sucrose (dry weight basis);
   10-35% non-sucrose soluble solids;
   1-20% non-hydrated insoluble starch having a particle size of 50 microns or less, wherein at least a portion of the starch is provided from a low protein flour; and
   8-25% moisture.

8. The pre-sweetener sugar slurry coating syrup of claim 7 additionally comprising 0.1% to about 15% of a finely milled insoluble fiber.

9. A pre-sweetener reduced sucrose hypocrystalline sugar slurry coating syrup, comprising:
   40-70% sucrose (dry weight basis);
   10-35% non-sucrose soluble solids;
   1-20% non-hydrated insoluble starch having a particle size of 50 microns or less; and,
   8-25% moisture, wherein the pre-sweetener sugar slurry coating syrup has a sucrose crystallinity value of 25% v/v or less and wherein at least a portion of the non-sucrose soluble solids is provided by an ingredient selected from the group consisting of corn syrup, glucose syrup, inulin, soluble corn fiber and mixtures thereof.

10. The pre-sweetener sugar slurry coating syrup of claim 9, having a fat content of up to 15%.

11. A method for preparing a pre-sweetener, reduced hypocrystalline sugar slurry coating syrup, comprising the steps:
- A. Preparing a sugar make-up slurry comprising:
  - 40-70% sucrose (dry weight basis),
  - 10-35% non-sucrose soluble solids,
  - 1-20% non-hydrated insoluble starch having a particle size of 50 microns of less, and,
  - 8-25% moisture; and
- B. Heating the sugar make-up slurry with agitation to below the gelatinization temperature of the starch at 170-250° F. (75-121° C.) to dissolve the sucrose and non-sucrose soluble solids to form a hot sugar slurry coating syrup.

12. The method of claim 11 wherein at least a portion of the starch is provided by a cereal grain bran.

13. The method of claim 11 additionally comprising the steps of:
- C. evaporatively concentrating the hot sugar slurry coating syrup by maintaining the temperature at below the gelatinization temperature of the starch to form a cooked hot sugar concentrated slurry coating syrup having a moisture content ranging from about 8 - 12% and wherein the non- hydrated starch remains-ungelatinized; and
- D. cooling the cooked hot sugar concentrated slurry coating syrup to a temperature of 162° F. (72° C.) or cooler to form a cooled concentrated sugar or saccharide slurry coating syrup having about 40-85% of sugar components and having 25% or less crystallinity.

14. The method of method for preparing a pre-sweetener, reduced hypocrystalline sugar slurry coating syrup of claim 11, wherein the non-hydrated insoluble starch is in the form of discrete particles that remain as discrete particles in the pre-sweetener reduced sucrose hypocrystalline sugar slurry coating syrup.

15. A method for preparing food pieces coated with a pre-sweetener, reduced sucrose hypocrystalline sugar slurry coating syrup comprising the steps of:
- (a) providing pieces of dried base;
- (b) preparing a sugar make-up slurry comprising:
  - 40-70% sucrose (dry weight basis);
  - 10-35% non-sucrose soluble solids;
  - 1-20% non-hydrated insoluble starch having a particle size of 50 microns or less; and
  - 8-25% moisture, wherein preparing the sugar make-up slurry further comprises: heating the make-up sugar slurry with agitation to below the gelatinization temperature of the starch at 170-250° F. (75-121° C.) to dissolve the sucrose and non-sucrose soluble solids to form a hot sugar slurry liquid;
- (c) coating the dried base pieces with the sugar make-up slurry as a pre-sweetener coating, wherein the weight ratio of dried base pieces to coating ranges from 10:1 to 0.5:1 to form coated pieces; and
- (d) reducing the moisture content of the coated pieces to a range of less than 5% to provide finished pre-sweetened coated food pieces.

16. The method of claim 15 wherein at least a portion of the dried base includes a R-T-E cereal.

17. The method of claim 16 wherein the coating additionally comprises about 5-10% of a calcium material.

18. The method of claim 17 wherein of the pre-sweetener coating is hypocrystalline and having a sucrose crystallinity of less than 25%.

19. The method of claim 15 additionally comprising the steps of:
- evaporatively concentrating the hot sugar slurry liquid by maintaining the temperature at below the gelatinization temperature of the starch to form a cooked hot sugar concentrated slurry syrup having a moisture content ranging from about 8-12% and wherein the non-hydrated starch remains ungelatinized; and
- cooling the cooked hot sugar concentrated slurry syrup to a temperature of 162° F. (72° C.) or cooler to form a cooled concentrated sugar or saccharide syrup having about 40-85% of sugar components and having 25% or less crystallinity.

20. The method of claim 15 wherein at least a portion of the starch is provided by a cereal grain bran.

21. The method for preparing food pieces coated with a pre-sweetener of claim 15, wherein the non-hydrated insoluble starch is in the form of discrete particles that remain as discrete particles in the pre-sweetener reduced sucrose hypocrystalline sugar slurry coating syrup.

\* \* \* \* \*